(12) United States Patent
Loveridge et al.

(10) Patent No.: US 6,449,076 B1
(45) Date of Patent: Sep. 10, 2002

(54) OPTICAL BEAM DIRECTOR FOR COMMUNICATIONS APPLICATIONS

(75) Inventors: Ronald C. Loveridge, Los Angeles; James Rogers, Woodland Hills; James S. Warniak, Hermosa Beach; Robert Moy, Redondo Beach, all of CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/249,541

(22) Filed: Feb. 12, 1999

(51) Int. Cl.[7] .............................................. H04B 10/00
(52) U.S. Cl. ....................................... 359/172; 359/159
(58) Field of Search .................................. 359/172, 159, 359/163

(56) References Cited

U.S. PATENT DOCUMENTS 5,142,400 A * 8/1992 Solinsky ..................... 359/172
5,592,320 A * 1/1997 Wissinger ................... 359/172
6,304,354 B2 * 10/2001 Carlson ...................... 359/172

* cited by examiner

*Primary Examiner*—Kinfe-Michael Negash
(74) *Attorney, Agent, or Firm*—Terje Gudmestad

(57) ABSTRACT

A satellite has an optical communications device coupled to a satellite body. The optical communications device has a laser light generator, a first optically refracting device, and a second optically refracting device. The first and second optically refracting devices are coupled to a respective movement mechanism. The movement mechanisms are used to position the optically refracting devices with respect to each other. By rotating the optically refracting devices about a common axis, either independent of each other and/or locked together, the optical output may be directed to a desired location.

21 Claims, 3 Drawing Sheets

OPTICAL BEAM DIRECTOR FOR COMMUNICATIONS APPLICATIONS

TECHNICAL FIELD

The present invention relates to space and communications satellites, and more particularly, to an optical beam directing apparatus on-board a satellite.

BACKGROUND ART

Satellites use radio frequency (RF) communications between the satellite and the Earth. Networks of satellites above the Earth may also communicate with each other via crosslinks. RF communications are possible for intersatellite communications, however, optical communications are preferred.

The advantage of optical intersatellite links over RF links derives from the increased data rates, reduced power consumption, smaller size, and lower weight of an optical telescope versus an RF antenna. As a result, a single satellite can carrymore communication terminals, thereby increasing the overall data-handling capacity.

Optical communications require a means for accurate pointing and tracking for extended periods of time. In known systems, very stable, highly accurate, mechanical gimbaling systems are used to direct the optical beam to its desired location. These mechanical gimbaling systems are mounted on the exterior of the spacecraft. The mechanical gimbal rotates the entire laser terminal to the direction required. Commonly, a painting mirror is used with the mechanical gimbal to acquire and maintain the beam on target. Also, a fast scan mirror is used to compensate for spacecraft motion and vibrations.

There are several drawbacks to a mechanical gimbal system. Commonly, the mechanical gimbal is very complex, very heavy, bulky, and power hungry. Also, an unobstructed volume outside the spacecraft must be provided so that the mechanical gimbal can point the optical telescope in the proper direction.

SUMMARY OF THE INVENTION

It is, therefore, one object of the invention to provide an optical communications device that is less resource intensive than those of the prior art. The present invention uses optical methods for beam movement rather than mechanical methods for beam movement as in the prior art.

In one aspect of the invention, a satellite has a satellite body and an optical communications device attached to the satellite body. The optical communications device has a laser light generator, a first optically refracting element optically coupled to the light generator, and a first movement device coupled to the optically refracting device. A second optically refracting element is optically coupled to the first optically refracting element. A second movement device is coupled to the second optically refracting element. A controller is coupled to the first movement device and the second movement device for controlling the relative position of the first optically refracting element and the second optically refracting element.

In a further aspect of the invention, a method for controlling an optical beam from a satellite comprises the steps of generating an optical beam; positioning a first optical device; directing the optical beam through the first optical device; refracting the optical beam; positioning a second optical device; and refracting the optical beam to a predetermined location.

One advantage of the invention is that the optical communication device may be fix mounted to the spacecraft. This eliminates the expensive and bulky rotating devices used in the prior art. This also allows the optical device to be thermally and mechanically isolated from the spacecraft.

Other objects and features of the present invention will become apparent when viewed in light of the detailed description of the preferred embodiment when taken in conjunction with the attached drawings and appended claims.

BEST MODEL(S) FOR CARRYING OUT THE INVENTION

The present invention is described with respect to an optical communications device used on a satellite. Those skilled in the art would recognize that the optical communications device may be used as an intersatellite link as well as for communications between a satellite and a ground station. Also, the present invention is suitable for use with any type electromagnetic radiation device.

Figure 1:
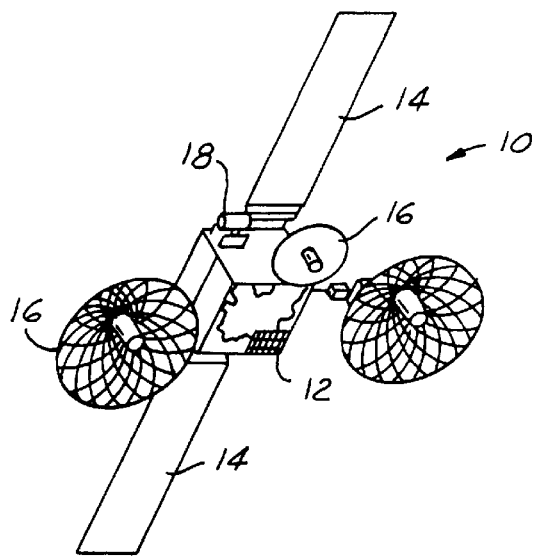
FIG. 1 is a perspective view of a satellite having an optical communications device according to the present invention.

Referring now to FIG. 1, a satellite 10 has a satellite body 12 that is used to house satellite telemetry tracking and control electronics (not shown). Solar panels 14 are also mounted to satellite body 12. Solar panels 14 convert solar energy into electrical energy for the satellite electronics. Antennas 16 are also coupled to satellite body 12. Antennas 16 are used for transmitting and receiving radio frequency information from the ground. Antennas 16 may also be used as intersatellite links. Antennas 16 are coupled to the satellite control electronics.

An optical communications device 18 is also coupled to the satellite body 12. Optical communications device 18 as shown is used as an intersatellite link. Optical communications device 18 may also be used for communications with a ground station in addition to, or in place of, antennas 16. Satellite 10 is shown having a single optical communications device for simplicity. In a constructed embodiment, several optical communications devices may be employed.

Figure 2:
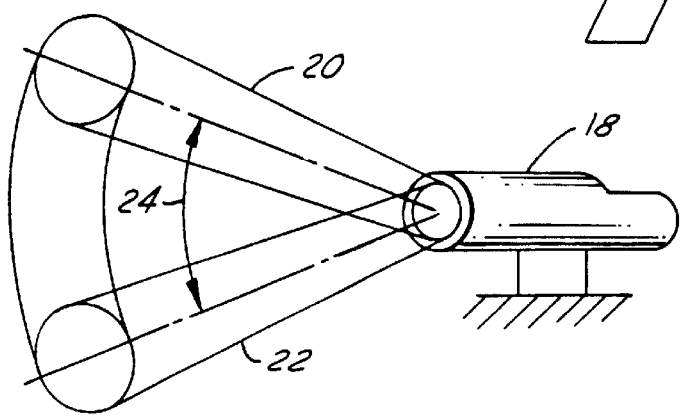
FIG. 2 is a perspective view of an optical communications device generating a beam according to the present invention.

Referring now to FIG. 2, a perspective view generally showing optical communications device 18. Optical communications device 18 generates a one-shaped beam that diverges from optical communication device 18. As illustrated, an upper beam 20 and a lower beam 22 are illustrated to represent the maximum extent of the movement of the optical beam by optical communications device 18. Upper beam 20 and lower beam 22 have an angle 24 representing the maximum beam travel angle between beams 20 and 22.

Figure 3:
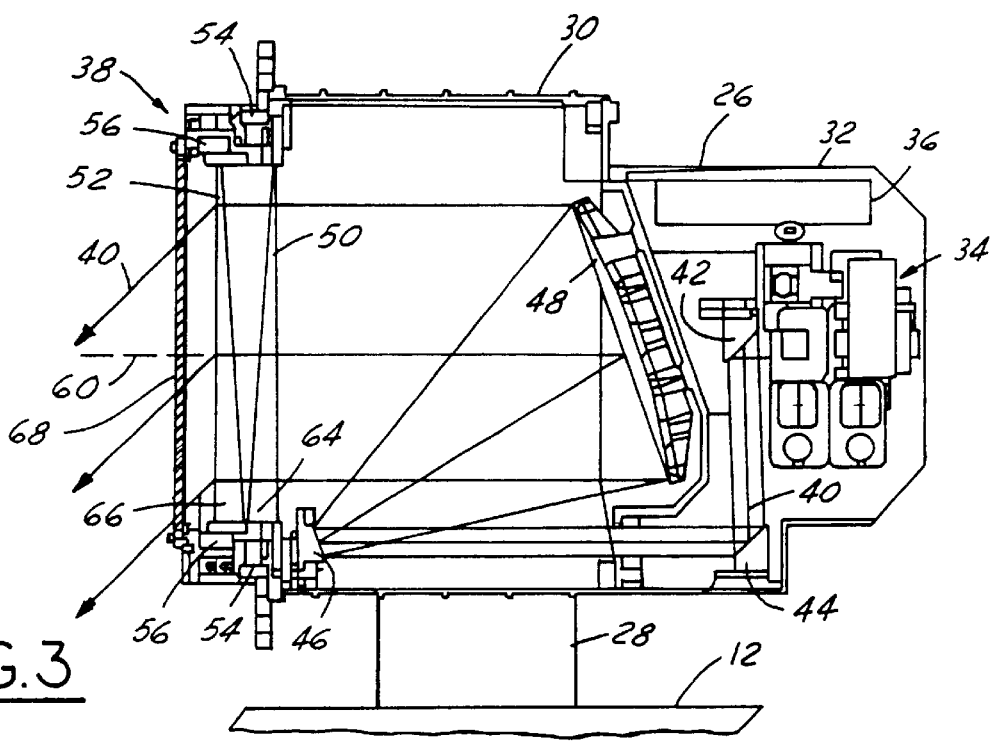
FIG. 3 is a cross-sectional view of an optical communications device according to the present invention.

Referring now to FIG. 3, a cross-sectional view of an optical communications device 18 is illustrated coupled to a portion of satellite body 12. Optical communications device 18 has a housing 26 that is fixedly mounted to a mount 28. Mount 28 is fixedly mounted to satellite body 12 or can provide course movement with respect to 12. Housing 26 generally has a beam directing portion 30 and a beam generating and control portion 32. Beam generating and control portion 32 generally comprises a laser generator 34 and a controller 36. Beam directing portion 30 has an optical signal director 38.

Controller 36 is coupled to optical signal director 38. Controller 36 is preferably microprocessor based and provides information to optical signal director 38 as to the prior direction of the optical beam. Controller 36 may also be used to control the content of the optical signal. In that case, controller 36 may be coupled to the spacecraft electronics where the communication signals originate. Laser generator 34 at the command of controller 36 generates a beam 40 that is eventually directed out of optical communications device 18. In the present example, a first reflector 42, a second reflector 44, a third reflector 46, and a fourth reflector 48 are used to redirect beam 40. In the illustrated example, reflectors 42 and 44, redirect the generally collimated beam. Reflectors 46 and 48 are the two elements of a 10:1 beam expander.

Optical signal director 38 generally comprises a first optically refracting device 50, a second optically refracting device 52, a first movement mechanism 54 coupled to the first optically refracting device 50, and a second movement mechanism 56 coupled to the second optically refracting device 52.

First optically refracting device 50 and second optically refracting device 52 are preferably circular, wedge-shaped that may be rotated with respect to each other by first movement mechanism 54 and second movement mechanism 56 respectively. First optically refracting device 50 and second optically refracting device 52 have a common axis 60 about which first optically refracting device 50 and second optically refracting device 52 rotate.

Each optically refracting device 50, 52 is preferably made from a high grade silicon material for laser communication at the wavelength of laser generator 34, although any optical transmitting material is useable. The material of refracting devices 50, 52 preferably has a high index of refraction and low absorption at the wavelength of the laser generator. Each optically refracting device 50, 52 has a wedge angle 66 and 64, respectively, which are determined by the index of refraction of the material. The surfaces of refracting devices 50, 52 are highly polished to minimize backscatter and anti-reflection coated to minimize surface reflections.

First movement mechanism 54 and second movement mechanism 56 rotate refracting devices 50, 52 independently or in concert to direct the beam 50 to a desired location. By using a wedge angle of 10 degrees for each silicon refracting device 50, 52, the beam may be directed anywhere within a cone with nearly 60° C. half angles.

Optical beam 40 is directed through a window 68 that encloses housing 26. Window 68 is formed of a material that is transmitting at the laser wavelength and is coated with a solar rejection coating so that a thermal balance may be maintained within housing 26.

Figure 4A:
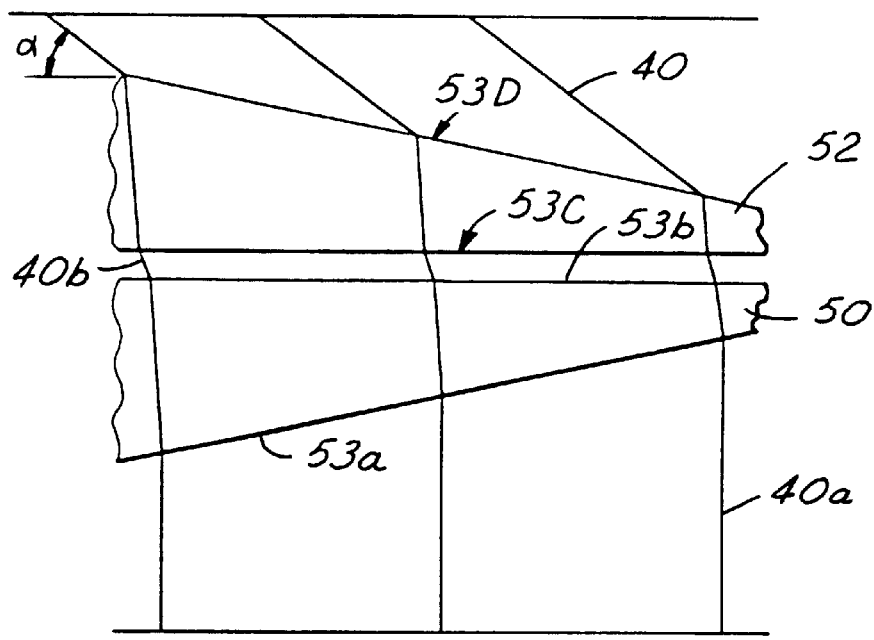
FIG. 4 is a ray diagram of an optically refracting device directing a beam.
Figure 4B:
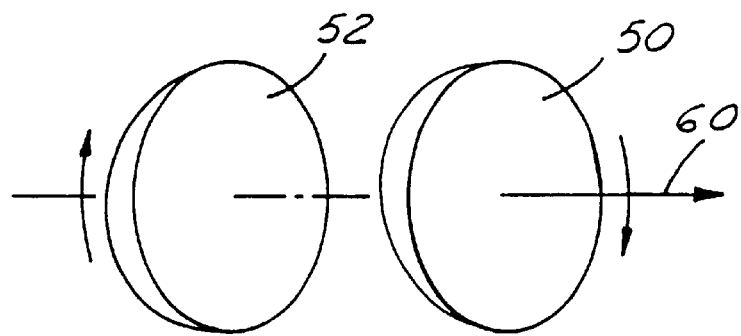

Referring now to FIGS. 4a and 4b, a pair of wedge-shaped optically refracting devices 50, 52 are shown. The beam 40 is refracted four times, twice by each of devices 50, 52. An unrefracted beam 40a originates from the laser generator 34 shown in FIG. 3. The unrefracted beam 40a is refracted at the outer surfaces 53a and 53b of wedge 50 according to Snell's Law to form first refracted beam 40b. Refracted beam 40b is then refracted again entering and leaving wedge 52. By rotating the two wedges 50, 52 about their common axis, the angle may be adjusted. Angle is the angle between a normal to unrefracted beam 40a.

Figure 5:
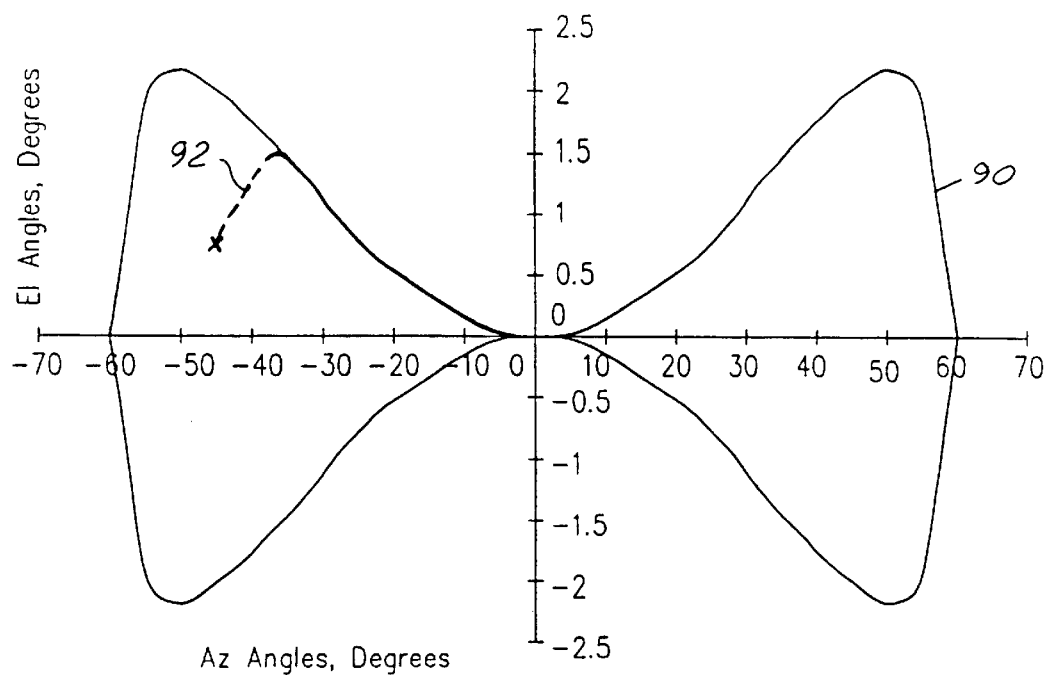
FIG. 5 is a beam pattern from a communications device having the refracting device of FIG. 4.

FIG. 5 illustrates a "dog bone" beam pattern 90, as would be projected onto a flat surface, that the refracted beam paints when the two refracting wedges are rotated independent of each other. Once the beam is located at a predetermined location on perimeter of this curve, the two wedges may be locked with respect to each other and the combined wedges are rotated together to move the beam to the desired location within the interior of the "dog bone" pattern as represented by reference numeral 92.

Figure 6:
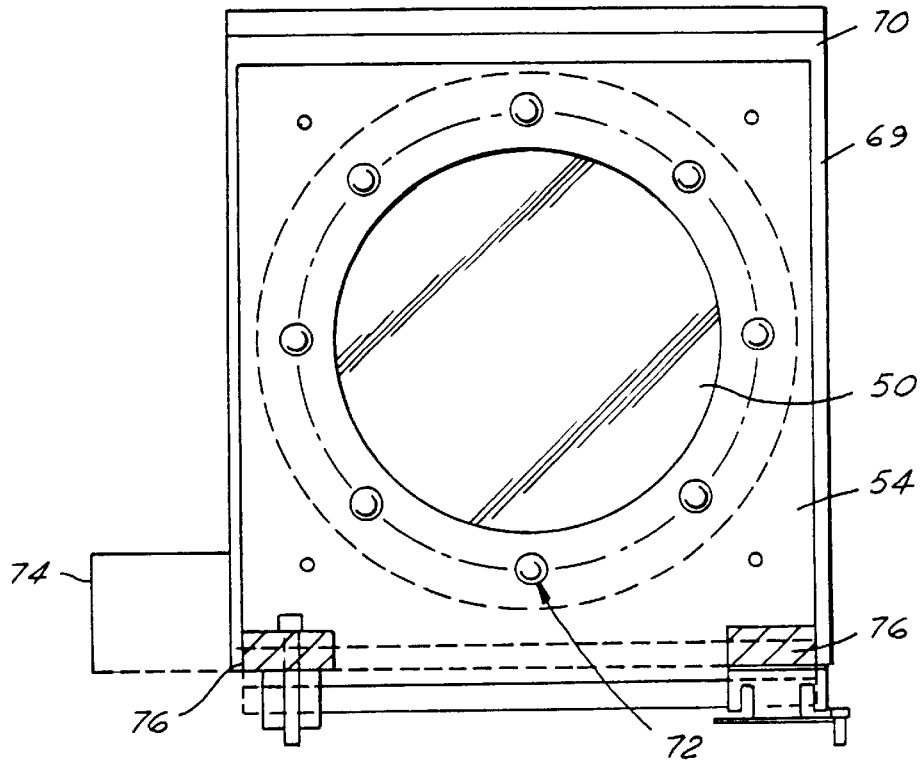
FIG. 6 is a view of a wedge mounting system for the present invention.

Referring now to FIG. 6, first movement mechanism 54 is shown in further detail. Second movement mechanism 56 may be the same as that of movement mechanism 54. Movement mechanism 54 generally is comprised of a frame 69 having a metal sleeve 70 holding precision ball bearings 72 therein. Motor 74 is used to rotate wedge 50 to its desired position. A locking device 76 is used to maintain wedge 50 in its desired position and to lock it to the other refracting wedge. The entire movement mechanism 54 should be space worthy and securely hold wedge 50 in a desired position. Several reliable mounting means would be evident to those skilled in the art.

In operation, after a satellite is deployed in space, an intersatellite link is established by directing the optical beam to another satellite. The optical beam is directed by rotating the optically refractive device 50 with respect to the second optically refractive device 52. Controller 36 controls the motor 74 which in turn controls the position of the optically refracting devices 50, 52. In the case of a low earth orbit (LEO), medium earth orbit satellites (MEO), and geosynchronous (GEO) satellites, controller 36 may be programmed to adjust the direction of the beam as the satellites move relative to each other. Controller 36 may also control the content of the signal. Once a signal has been received from a ground station or another satellite, optical communications device 18 may be used to transmit the signal to another satellite. Controller 36 may control the content of the optical signal in a variety of known manners including modulating the optical signal.

While particular embodiments of the invention have been shown and described, numerous variations and alternate embodiments will occur to those skilled in the art. Accordingly, it is intended that the invention be limited only in terms of the appended claims.

What is claimed is:

1. A satellite comprising:
   a satellite body;
   a optical communications device coupled to said satellite body, said optical communications device having,
   an electromagnetic source generator;
   a first optically refracting device optically coupled to said generator;
   a first movement mechanism coupled to said optically refracting device
   a second optically refracting device optically coupled to said first optically refracting device;
   a second movement mechanism coupled to said second optically refracting device; and
   a controller coupled to said first movement mechanism and said second movement mechanism for controlling of a first optically refracting device and a second optically refracting device.

2. A satellite as recited in claim 1 wherein said first optically refracting device and said second optically refracting device have a common axis of rotation, said first movement mechanism rotating said first optically refracting device about said common axis of rotation and, said second movement mechanism rotating said second optically refracting device about said common axis of rotation.

3. A satellite as recited in claim 1 wherein said first optically refracting device has a circular wedge shape and said second optically refracting device is a circular and wedge shape.

4. A satellite as recited in claim 1 further comprising a mount for coupling a said optical communications device to said satellite body.

5. A satellite as recited in claim 1 wherein said first movement mechanism and said second movement mechanism comprise a motor.

6. A satellite as recited in claim 1 further comprising sleeves and ball bearings coupled to said first optically refracting device and said second optically refracting device.

7. A satellite as recited in claim 1 further comprising a locking device coupled to said first and second refracting devices for locking said first and second refracting devices in a predetermined position with respect to each other and/or to the satellite body.

8. A satellite as recited in claim 1 wherein said optical signal is coupled to said first refracting device with a plurality of reflectors.

9. A satellite as recited in claim 1 wherein said optical communications device is thermally and mechanically isolated from said satellite body.

10. An optical communications device comprising:
a housing having a beam directing portion and a beam generating control portion;
an electromagnetic source generator disposed within said beam generating control portion;
a first optically refracting device disposed within said beam directing portion, said first refracting device optically coupled to said generator;
a first movement mechanism disposed within said beam directing portion coupled to said optically refracting device;
a second optically refracting device disposed within said beam directing portion and optically coupled to said first optically refracting device;
a second movement mechanism disposed within said beam directing portion, a second movement mechanism coupled to said second optically refracting device; and
a controller coupled to said first movement mechanism and said second movement mechanism for controlling a first optically refracting device and a second optically refracting device.

11. An optical communications device as recited in claim 10 wherein said first optically refracting device and said second optically refracting devices have a common axis of rotation, said first movement mechanism rotating said first optically refracting device about said common axis of rotation, and said second movement mechanism rotating said second optically refracting device about said common axis of rotation.

12. An optical communications device as recited in claim 10 wherein said first optically refracting device has a circular and wedge shape and said second optically refracting device has a circular and wedge shape.

13. An optical communications device as recited in claim 10 wherein said first movement mechanism and said second movement mechanism comprise a motor.

14. An optical communications device as recited in claim 10 further comprising sleeves and ball bearings coupled to said first optically refracting device and to said second optically refracting device.

15. An optical communications device as recited in claim 10 further comprising a locking device coupled to said first and second refracting devices for maintaining said first and second refracting device together and in predetermined positions.

16. An optical communications device as recited in claim 10 wherein said optical signal is coupled to said first refracting device with a plurality of reflectors.

17. An optical communications device as recited in claim 10 further comprising a window coupled to the housing.

18. A method for controlling an optical beam comprising the steps of:
generating an optical beam;
positioning a first wedge shaped optical device;
directing the optical beam through said first wedge shaped optical device;
refracting the optical beam with said first wedge shaped optical device;
positioning a second wedge shaped optical device; and
refracting the optical beam with the second wedge shaped optical device to direct the beam to a predetermined location.

19. A method of controlling an optical beam as recited in claim 18 wherein the step of positioning the second optical device comprises positioning the second optical device independently from the first optical device or locked with the first optical device.

20. A method of controlling an optical beam as recited in claim 18 further comprising the step of directing the optical beam through a window.

21. A method of controlling an optical beam as recited in claim 18 wherein the step of positioning a first optical device comprises rotating a first optical device and said step of positioning a second optical device comprises rotating a second optical device.

* * * * *